United States Patent
Lin et al.

(10) Patent No.: US 11,822,505 B2
(45) Date of Patent: Nov. 21, 2023

(54) SYSTEMS AND METHODS FOR REMOTE MANAGEMENT OF A NETWORK DEVICE

(71) Applicant: Quanta Computer Inc., Taoyuan (TW)

(72) Inventors: Wei-Hung Lin, Taoyuan (TW); Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 30 days.

(21) Appl. No.: 17/513,463

(22) Filed: Oct. 28, 2021

(65) Prior Publication Data
US 2023/0140388 A1    May 4, 2023

(51) Int. Cl.
G06F 13/42    (2006.01)

(52) U.S. Cl.
CPC .. *G06F 13/4282* (2013.01); *G06F 2213/0016* (2013.01)

(58) Field of Classification Search
CPC .............. G06F 13/4282; G06F 2213/0016
See application file for complete search history.

(56) References Cited

U.S. PATENT DOCUMENTS

| | | | | |
|---|---|---|---|---|
| 2013/0010787 A1* | 1/2013 | Chou | ............... | H05K 7/1498 361/679.02 |
| 2014/0289570 A1* | 9/2014 | Lewis | ............... | G06F 11/3089 714/43 |
| 2014/0298045 A1* | 10/2014 | Sieber | ............... | G06F 1/263 713/300 |
| 2016/0072642 A1* | 3/2016 | Shih | ............... | H04L 12/4666 370/392 |
| 2017/0155573 A1* | 6/2017 | Khemani | ............ | H04L 41/0663 |
| 2019/0026467 A1* | 1/2019 | Suryanarayana | ....... | G06F 21/57 |
| 2019/0053290 A1* | 2/2019 | Raju | .................... | H04W 40/244 |
| 2019/0220340 A1* | 7/2019 | Chou | .................. | G06F 11/0709 |
| 2020/0250430 A1 | 8/2020 | Kishore et al. | | |
| 2020/0371695 A1* | 11/2020 | Gopal | .................. | G06F 3/0658 |
| 2021/0042156 A1* | 2/2021 | Rahardjo | ................ | G06F 13/20 |

FOREIGN PATENT DOCUMENTS

| | | |
|---|---|---|
| CN | 104378218 A | 2/2015 |
| TW | 301939 B1 * | 10/2008 |
| TW | I301939 B | 10/2008 |
| TW | I553452 B | 10/2016 |

OTHER PUBLICATIONS

TW Office Action for Application No. 111108705, dated Oct. 13, 2022, w/ First Office Action Summary.
TW Search Report for Application No. 111108705, dated Oct. 13, 2022, w/ First Office Action.

* cited by examiner

*Primary Examiner* — Farley Abad
*Assistant Examiner* — Henry W Yu
(74) *Attorney, Agent, or Firm* — NIXON PEABODY LLP

(57) ABSTRACT

A computing system includes a processing unit and a network device. The processing unit includes a first baseboard management controller (BMC), an external network interface coupled to the first BMC, and a first internal network interface coupled to the first BMC. The network device includes a second BMC and a second internal network interface coupled to the second BMC. The second internal network interface of the network device is connected to the first internal network interface of the processing unit. The first BMC is configured to transfer data between an external network and the second BMC via (i) the external network interface, (ii) the first internal network interface, and (iii) the second internal network interface.

20 Claims, 3 Drawing Sheets

SYSTEMS AND METHODS FOR REMOTE MANAGEMENT OF A NETWORK DEVICE

TECHNICAL FIELD

The present invention relates generally to communication between a processing device and a network device, and more specifically, to systems and methods for remote management of a network switch via a processing device.

BACKGROUND

Servers are employed in large numbers for high demand applications, such as network-based systems or data centers. The emergence of cloud computing applications has increased the demand for data centers. Data centers have numerous servers that store data and run applications accessed by remotely-connected computer device users. A typical data center has physical rack structures with attendant power and communication connections. Each rack may hold multiple computing servers and storage servers. Each server generally includes hardware components such as processing units, memory devices, network interface cards, power supplies, network switches, and other specialized hardware. The processing units generally include a baseboard management controller that manages the operation of hardware components as well as support components such as power supplies and fans. The baseboard management controller of the processing unit can be connected directly to an external network, so that a user may remotely access the processing unit for out-of-band management. The network switches also generally include their own baseboard management controllers. However, the network switches generally cannot be directly connected to an external network to allow for remote access. Thus, systems and methods for remote management of a network switch are needed.

SUMMARY OF THE INVENTION

The term embodiment and like terms, e.g., implement, configuration, aspect, example, and option, are intended to refer broadly to all of the subject matter of this disclosure and the claims below. Statements containing these terms should be understood not to limit the subject matter described herein or to limit the meaning or scope of the claims below. Implementations of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system includes a processing unit and a network device. The processing unit includes a baseboard management controller (BMC), an external network interface coupled to the BMC, and a first internal network interface coupled to the BMC. The network device includes a BMC and a second internal network interface coupled to the BMC. The second internal network interface of the network device is connected to the first internal network interface of the processing unit. The first BMC is configured to transfer data between an external network and the second BMC via (i) the external network interface, (ii) the first internal network interface, and (iii) the second internal network interface.

In some implementations, the data includes one or more management requests associated with the network device, and the first BMC is configured to receive the one or more management requests from the external network via the external network interface.

In some implementations, the first BMC is configured to transmit the one or more management requests to the second BMC via the first internal network interface and the second internal network interface.

In some implementations, the second BMC is configured to generate at least one response to the one or more management requests and transmit the at least one response to the first BMC via the first internal network interface and the second internal network interface.

In some implementations, the first BMC is configured to transmit the one or more responses to the one or more management requests to the external network via the external network interface.

In some implementations, the first internal network interface includes (i) a first physical layer (PHY) circuit and (ii) a first reduced media-independent interface (RMII) connection that connects the first PHY circuit to the first BMC.

In some implementations, the second internal network interface includes (i) a second PHY circuit and (ii) a second RMII connection that connects the second PHY circuit to the second BMC.

In some implementations, the first PHY circuit of the processing unit and the second PHY circuit of the network device are connected together via a wired connection.

In some implementations, the wired connection is an Ethernet connection.

In some implementations, the external network interface of the processing unit includes (i) a network interface card (NIC) and (ii) an RMII connection that couples the NIC to the first BMC.

In some implementations, the NIC of the processing unit is coupled to the external network via a wired connection or a wireless connection.

In some implementations, the first BMC includes a first data interface and a second data interface. The first data interface of the first BMC forms a portion of the external network interface. The second data interface of the first BMC forms a portion of the first internal network interface.

In some implementations, the first BMC includes a data bridge between the first data interface and the second data interface, to thereby transfer data between the external network interface of the processing unit and the first internal network interface of the processing unit.

In some implementations, the processing unit includes a first serial communications interface, and the network device includes a second serial communications interface coupled to the first serial communications interface via an inter-integrated circuit ($I^2C$) connection.

In some implementations, the second BMC is configured to transmit a MAC address of the network device to the first BMC via the first and second serial communications interfaces.

In some implementations, the network device is a network switch.

According to certain aspects of the present disclosure, a method of managing a network device comprises receiving, at a baseboard management controller (BMC) of a processing unit, a management request from an external network. The method further comprises transmitting, via an internal network, the management request from the BMC of the processing unit to a BMC of a network device. The method further comprises generating, by the BMC of the network device, a response to the management request. The method further comprises transmitting, via the internal network, the response to the management request from the BMC of the network device to the BMC of the processing unit. The method further comprises transmitting the response to the management request from the BMC of the processing unit to the external network In some implementations, the method further comprises generating a virtual data bridge between (i) a first data interface of the BMC of the processing unit and (ii) a second data interface of the BMC of the processing unit. The method further comprises receiving, at the BMC of the processing unit, a unique identifier that is associated with the network device. The method further comprises in response to receiving the management request at the first data interface and determining that the management request includes the unique identifier, outputting the management request at the second data interface. The first data interface is connected to the external network, and the second data interface is connected to the BMC of the network device via the internal network.

In some implementations, the method further comprises receiving the response to the management request at the second data interface of the BMC of the processing unit. The method further comprises outputting the response to the management request at the first data interface of the BMC of the processing unit.

In some implementations of the method, the network device is a network switch.

The above summary is not intended to represent each implementation or every aspect of the present disclosure. Rather, the foregoing summary merely provides an example of some of the novel aspects and features set forth herein. The above features and advantages, and other features and advantages of the present disclosure, will be readily apparent from the following detailed description of representative implementations and modes for carrying out the present invention, when taken in connection with the accompanying drawings and the appended claims. Additional aspects of the disclosure will be apparent to those of ordinary skill in the art in view of the detailed description of various implementations, which is made with reference to the drawings, a brief description of which is provided below.

BRIEF DESCRIPTION OF THE DRAWINGS

The disclosure, and its advantages and drawings, will be better understood from the following description of representative implementations together with reference to the accompanying drawings. These drawings depict only representative implementations, and are therefore not to be considered as limitations on the scope of the various implementations or claims.

DETAILED DESCRIPTION

Figure 1:
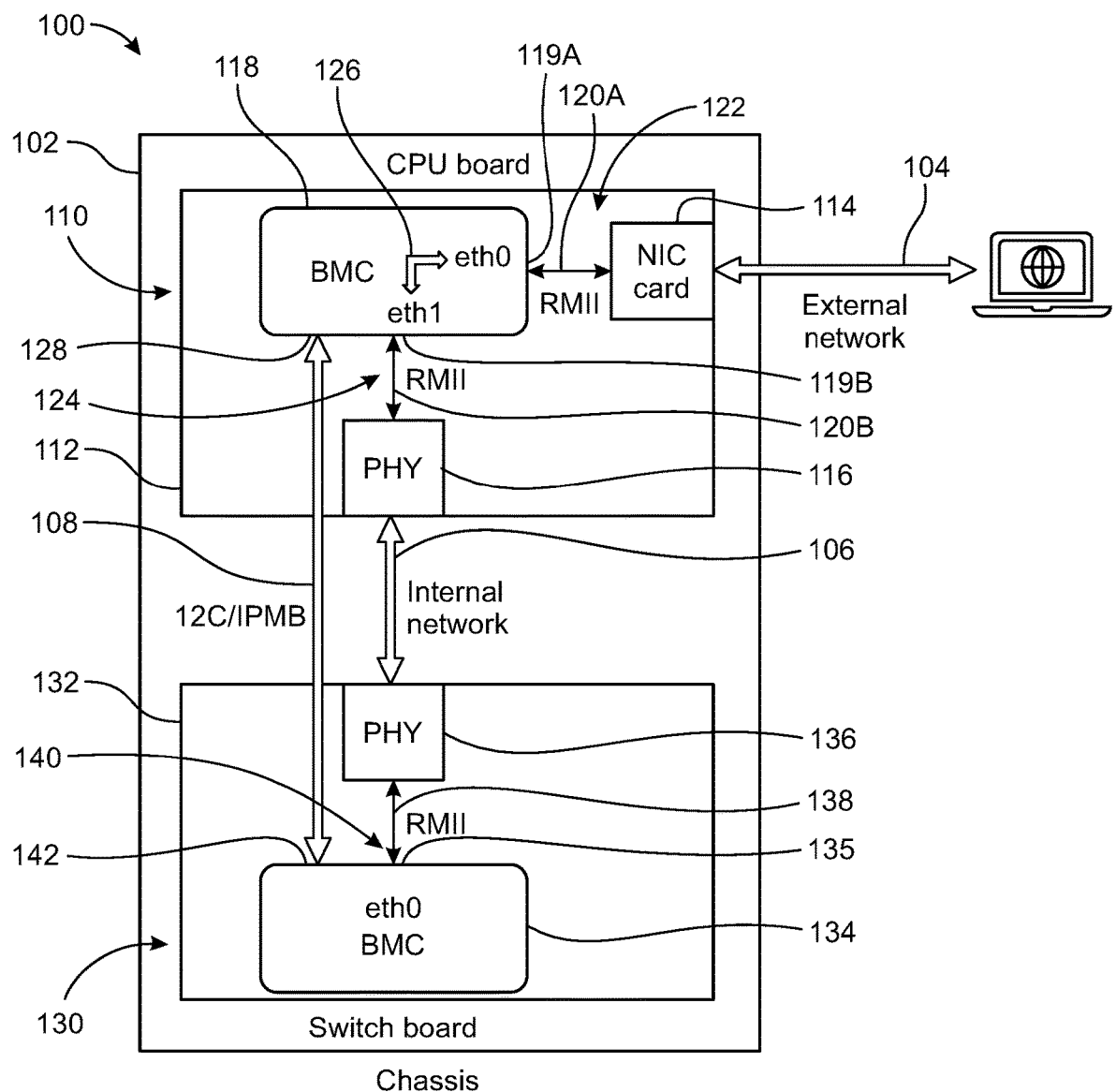
FIG. 1 is a block diagram of a system for remote management of a network device using a separate processing device, according to certain aspects of the present disclosure.

Network systems (such as servers) include baseboard management controllers that allow for the systems to be accessed and managed remotely (referred to as out-of-band management) via a connection with an external network. The baseboard management controllers can be used to monitor various components of the systems, and to perform tasks such as reboots and shutdowns. Some network devices within these systems do not allow for out-of-band management via a direct connection to the external network however. Disclosed herein are systems and methods for remotely managing a network device using the baseboard management controller of a different device.

Various implementations are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various implementations disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 illustrates a computing system 100 for remote management of a network device. The system 100 can be a computing server, a storage server, or any other network-connected computing system. The system 100 includes a chassis 102, a processing unit 110 disposed within the chassis 102, and a network switch 130 disposed within the chassis 102. The processing unit 110 is configured to perform the main computing functions of the computing system 100. The processing unit 110 includes a motherboard 112 and a variety of components disposed on the motherboard 112. The components disposed on the motherboard 112 include a central processing unit (not shown), a network interface card (NIC) 114, a physical layer (PHY) circuit 116, and a baseboard management controller (BMC) 118. The BMC 118 of the processing unit 110 is also referred to herein as a first BMC. The motherboard 112 may include or be connected to numerous other components that are not illustrated, including memory devices (e.g., RAM, flash storage, etc.), other computer chips (e.g., a north bridge chip, a south bridge chip, etc.) variety of input/output interfaces, power supplies, fan modules, temperature sensors, etc. The BMC 118 generally includes its own processing unit and memory device. The processing unit of the BMC 118 can be used to execute firmware stored on the memory device of the BMC 118. The BMC 118 is configured to manage the operation of the processing unit 110. For example, the BMC 118 can monitor temperatures and voltages at the processing unit 110, and adjust operation of any components as necessary.

The BMC 118 also allows for remote access to the processing unit 110 via the NIC 114. Remote access by a user (such as an IT technician) can allow the user to remotely reboot or shut down the processing unit 110, monitor various components of the processing unit 110, etc. This type of remote management is sometimes referred to as out-of-band management. The BMC 118 includes a first data interface 119A that is connected to the NIC 114 via a first reduced media-independent interface (RMII) connection 120A. In some implementations, the first data interface 119A is an Ethernet interface. The NIC 114 (which could include Ethernet ports, USB ports, a wireless transceiver, etc.) is configured to connect to an external network 104. Together, the NIC 114, the first data interface 119A of the BMC 118, and the first RMII connection 120A form an external network interface 122 of the processing unit 110. The external network interface 122 connects the processing unit 110 to the external network 104, and allows a user to remotely access the BMC 118 for out-of-band management of the processing unit 110.

The processing unit 110 also includes an internal network interface 124 that allows the processing unit 110 to connect to the network switch 130. The internal network interface 124 includes a second data interface 119B of the BMC 118, the PHY circuit 116, and a second RMII connection 120B. The second RMII connection 120B connects the second data interface 119B of the BMC 118 to the PHY circuit 116. The PHY circuit 116 is a circuit (such as an integrated circuit) that aids in transferring data between the processing unit 110 and the network switch 130. Generally, the PHY circuit 116 will include a physical port that receives data signals from the network switch 130, and circuitry required to translate the data signals into a format that can be transmitted to the BMC 118. In some implementations, the PHY circuit 116 includes an Ethernet port that is used to connect the processing unit 110 and the network switch 130. Thus, the internal network interface 124 allows the processing unit 110 to communicate with the network switch 130.

The network switch 130 includes a network switch board 132 and a variety of components disposed on the network switch board 132. These components (which are not illustrated) can include computing components (such as processing units, complex programmable logic devices, etc.) fans, power supplies, supporting circuitry, etc. The network switch 130 also includes a number of input/output interfaces (such as Ethernet ports). The input/output interfaces can be used to connect a variety of different devices to the network switch 130, such as other components of the system 100, other systems similar to system 100, other devices, etc. Together, the network switch 130 and any devices connected to the network switch 130 (such as the processing unit 110) are connected on an internal network.

The network switch board 132 also includes a BMC 134 and a PHY circuit 136. The BMC 134 can be similar to the BMC 118 of the processing unit 110, and can be used to monitor the performance of various components of the network switch 130. The BMC 134 of the network switch 130 is also referred to herein as a second BMC. The PHY circuit 136 can be similar to the PHY circuit 116 of the processing unit 110, and aids in transferring data between the network switch 130 and the processing unit 110. The PHY circuit 136 may include a physical port (such as an Ethernet port), similar to the PHY circuit 116 of the processing unit 110. The BMC 134 includes a data interface 135 (which in some implementations is an Ethernet interface) that is connected to the PHY circuit 136 via an RMII connection 138. Together, data interface 135 of the BMC 134, the PHY circuit 136, and the RMII connection 138 form an internal network interface 140 of the network switch 130.

The internal network interface 140 of the network switch 130 is connected to the internal network interface 124 of the processing unit 110 via an internal network connection 106 between the PHY circuit 116 and the PHY circuit 136. In some implementations, the internal network connection 106 is a wired connection (such as via an Ethernet cable or a USB cable). In other implementations, the internal network connection 106 is a wireless connection.

In some implementations, the PHY circuit 136 forms a portion of or all of the input/output interfaces of the network switch 130. In these implementations, the PHY circuit 136 will generally include a number of physical ports (such as Ethernet ports). One of these ports is used to connect the network switch 130 to the processing unit 110. The other ports are then used to connect together any other desired components on the internal network.

While the network switch 130 includes the BMC 134 and a variety of input/output interfaces (such as Ethernet ports), the BMC 134 is generally not configured to allow for out-of-band management via the BMC 134 and the PHY circuit 136. Thus, while the network switch 130 can be connected to the internal network via the PHY circuit 136, the network switch 130 cannot be directly connected to the external network 104 to allow for remote access and out-of-band management. Instead, the BMC 118 of the processing unit 110 can be used as an intermediate connection between (i) the external network 104 and (ii) the BMC 134 of the network switch 130.

The firmware that is executed by the BMC 118 can include instructions that implement a data bridge 126 between the first data interface 119A and the second data interface 119B. In some implementations, the data bridge 126 is a virtual data bridge. In these implementations, the firmware causes the BMC 118 to re-route data that is received by the BMC 118 from the external network 104, but is intended for the network switch 130. If the BMC 118 receives data at the first data interface 119A that is intended to reach the BMC 134 of the network switch 130, the BMC 118 outputs that data at the second data interface 119B. Because the second data interface 119B is connected to the BMC 134 of the network switch 130, the data from the external network 104 that is intended for the network switch 130 can reach the BMC 134, even though the network switch 130 is not connected directly to the external network 104.

Generally, data received from the external network 104 will include one or more out-of-band management requests. For example, these management requests could include a request to reboot the network switch 130, a request to shut down the network switch 130, a request to modify operation of one or more fan modules of the network switch 130, etc. When the BMC 134 receives a management request, the BMC 134 can cause a desired task to be completed (e.g., rebooting the network switch 130), and/or generate a response to the management request. For example, the management request may include a status request. The response to the status request can include information related to the status of the network switch 130, and/or the statuses of various components of the network switch 130.

In some implementations, the response to the management request is generated after completion of the desired task, and may include confirmation that the task was completed. For example, if the BMC 134 receives a request to reboot the network switch 130, the BMC 134 can cause the network switch 130 to be rebooted, and then generate a confirmation that the reboot process has been completed. The BMC 134 can transmit this confirmation to the BMC 118, via the internal network interface 124, the internal network interface 140, and the internal network connection 106. The BMC 118 receives the response to the management request at the second data interface 119B, and can output the response at the first data interface 119A, such that the response is transmitted to the external network 104. Thus, the response can be transmitted to the external network 104 via the external network interface 122 of the processing unit 110.

In some implementations, a management request for the network switch 130 includes a unique identifier that indicates that the management request is intended for the network switch 130, instead of the processing unit 110 (or any other component). When the BMC 118 receives the management request from the external network 104, the BMC 118 is configured to check if the management request contains a unique identifier. In response to determining that the management request contains the unique identifier of the network switch 130, the BMC 118 transmits the management request to the network switch 130. In some implementations, the unique identifier is a media access control (MAC) address of the network switch 130.

In order to route management requests (and/or other data) intended for the network switch 130, the BMC 118 must know the unique identifier (such as the MAC address) of the network switch 130. Thus, the unique identifier can be transmitted to and stored by the BMC 118 when the system 100 is configured. The BMC 118 can then compare a unique identifier contained in a received management request to the stored unique identifier of the network switch 130. In the illustrated implementation, the BMC 118 includes a serial communications interface 128, while the BMC 134 includes a serial communications interface 142. The serial communications interface 128 and the serial communications interface 142 can be connected together via a serial connection 108, which in some implementations is an inter-integrated circuit (I²C) bus. The BMC 134 can transmit the unique identifier of the network switch 130 to the BMC 118 via the serial communications interfaces 128 and 142, and the serial connection 108. In some cases, the BMC 118 and the BMC 134 do not know the IP addresses of each other, and cannot communicate with each other over the internal network 106 until the MAC address of the network switch 130 is transmitted to the BMC 118 via the serial communications interfaces 128 and 142, and the serial connection 108. However, in other implementations, the BMC 134 can transmit the unique identifier of the network switch 130 to the BMC 118 via the internal network interfaces 124 and 142, and the internal network connection 106.

In the illustrated implementation, system 100 includes the network switch 130 that is connected to the processing unit 110 to allow for out-of-band management of the network switch 130. However, any suitable network device could be used, including the network switch 130. In these implementations, the network device will include a BMC that can be coupled to the BMC 118 of the processing unit 110 via the internal network connection 106. Communication between the external network 104 and the network device for out-of-band management will generally occur in the same manner as with the network switch 130.

Figure 2:
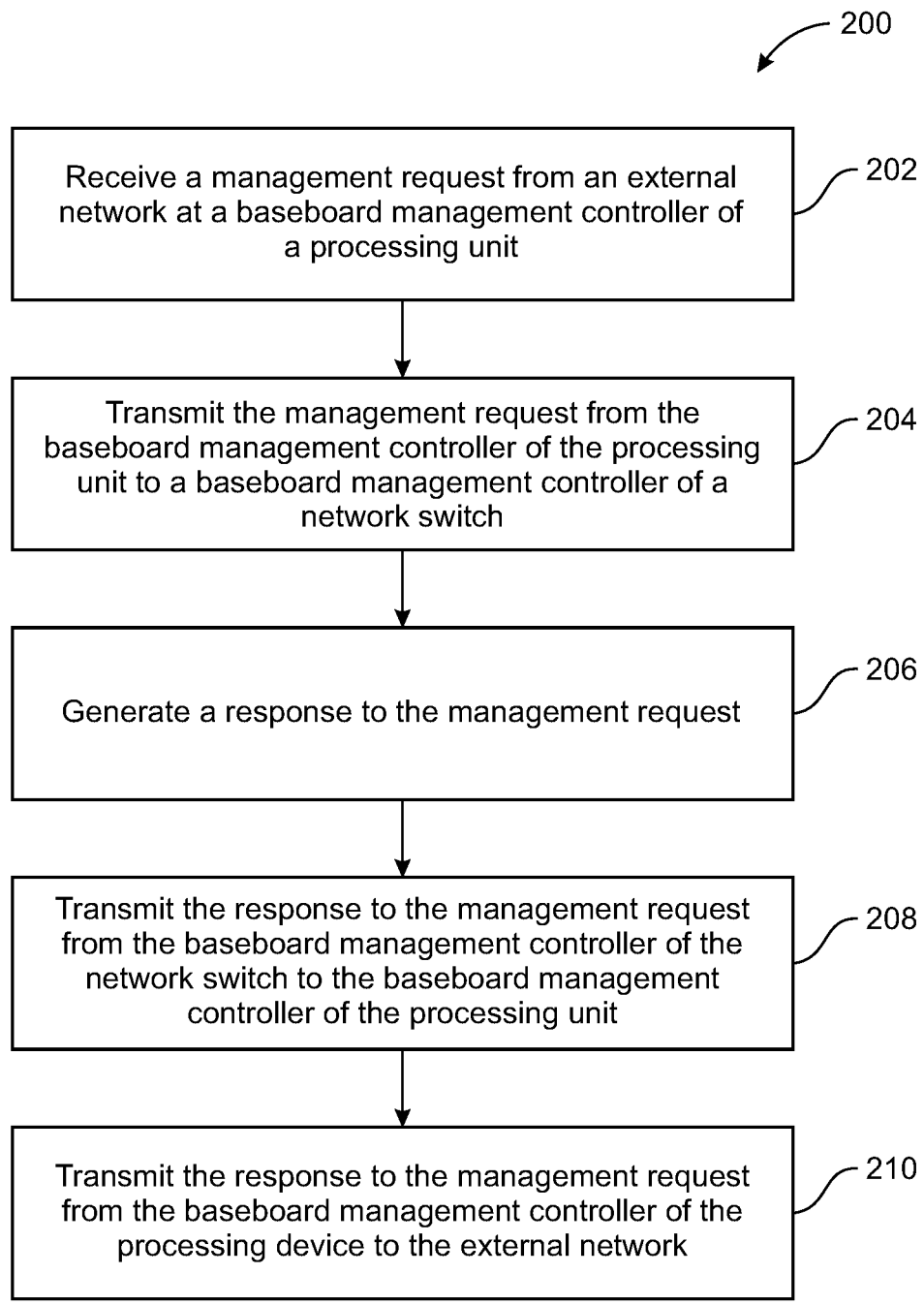
FIG. 2 is a flow diagram of a method of remotely managing a network device using the system of FIG. 1, according to certain aspects of the present disclosure.

FIG. 2 illustrates a flow diagram of a method 200 of remotely managing a network device (such as network switch 130). At step 202, a management request is received at a BMC of a processing unit (such as BMC 118 of processing unit 110). The management request can be received from an external network (such as external network 104). At step 204, the management request is transmitted from the BMC of the processing unit to a BMC of the network device (such as BMC 134 of network switch 130). In some implementations, the management request is transmitted to the BMC of the network device via an internal network connection (such as the internal network connection 106). At step 206, the BMC of the network device generates a response to the management request. In some implementations, the response is a confirmation that a desired task (such as a reboot or a shutdown) has been completed. In other implementations, the response includes information related to the status of the network device and/or various components of the network device. At step 208, the response to the management request is transmitted from the BMC of the network device to the BMC of the processing unit. In some implementations, the response to the management request is transmitted via the internal network. At step 210, the response to the management request is transmitted from the BMC of the processing unit to the external network.

In some implementations, the method 200 can include additional steps. For example, in some implementations, the BMC of the processing unit includes a first data interface (such as first data interface 119A) connected to the external network, and a second data interface (such as second data interface 119B) connected to the BMC of the network device via the internal network connection. The method 200 can include generating a virtual data bridge between the first data interface and the second data interface of the BMC of the processing unit. The management request can be received at the first data interface, and output at the second data interface. In these implementations, method 200 can further include receiving the response to the management request at the second data interface of the BMC of the processing unit, and outputting the response to the management request at the first data interface of the BMC of the processing unit.

In some implementations, method 200 includes receiving a unique identifier (such as a MAC address) of the network device at the BMC of the processing unit. In these implementations, the BMC can determine whether the management request includes the unique identifier of the network device. In response to receiving the management request at the first data interface and determining that the management request includes the unique identifier of the network device, the BMC of the processing unit can output the management request at the second data interface.

Figure 3:
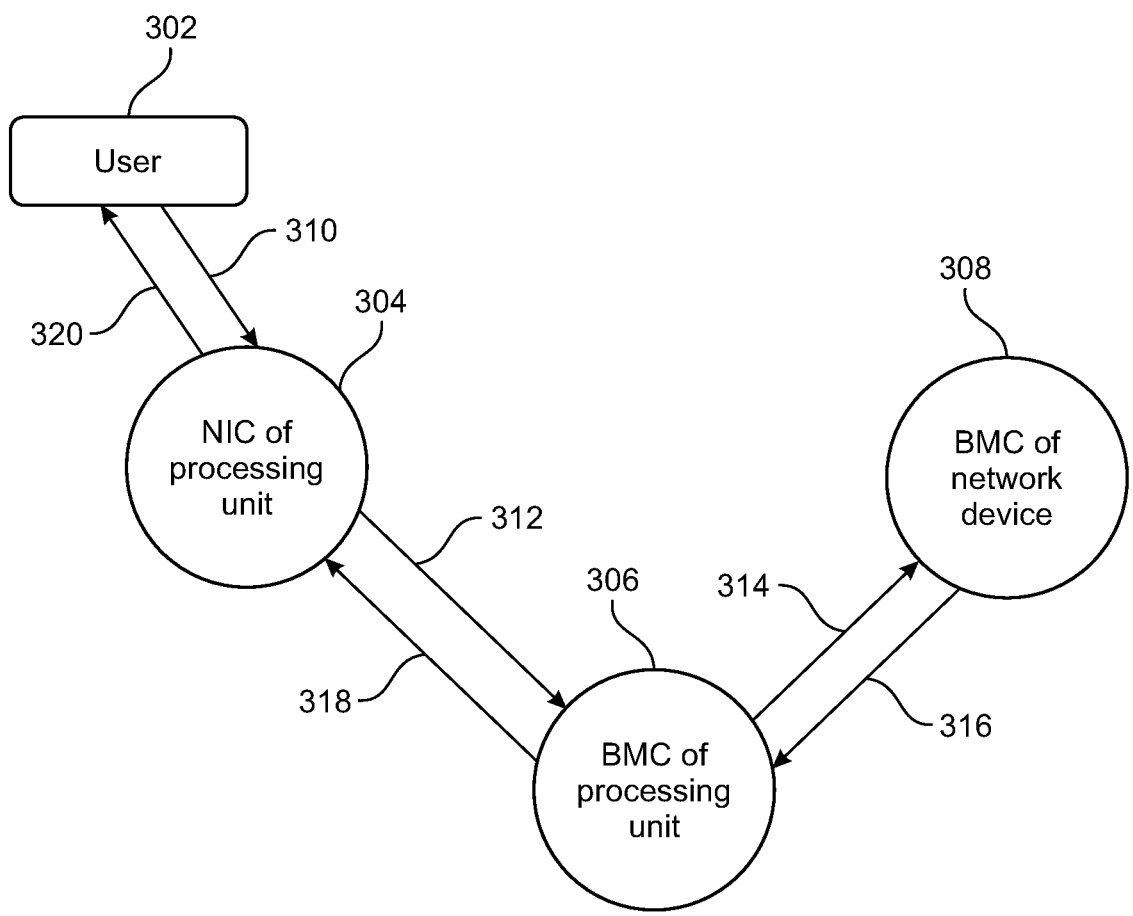
FIG. 3 is a diagram of the flow of network packets through the system of FIG. 1, according to certain aspects of the present disclosure.

FIG. 3 is a chart showing the flow of network packets through the system 100. At inbound data flow 310, a network interface card (MC) 304 receives a first set of one or more network packets from a user 302 over an external network. The NIC 304 may be a NIC of a processing unit, such as the NIC 114 of the processing unit 110. The NIC 304 has an external network interface that connects the MC 304 to the external network. Generally, the first set of one or more network packets will include one or more management requests that are intended to be sent to a BMC 308. The BMC 308 can be the BMC of a network device, such as the BMC 134 of the network switch 130. The first set of one or more network packets will generally include a unique identifier associated with the BMC 308. In some implementations, the unique identifier is a MAC address. The NIC 304 implements a filter (such as a MAC filter) that determines the intended destination of the first set of one or more network packets based on the unique identifier, so that the NIC 304 can forward the first set of one or more network packets to the identified destination.

At inbound data flow 312, the NIC 304 forwards the first set of one or more network packets to a BMC 306 of the processing unit. The BMC 306 can be the same as or similar to the BMC 118 of the processing unit 110. Generally, the BMC 306 receives the first set of one or more network packets at a first data interface (which may be a first Ethernet interface), and outputs the first set of one or more network packets at a second data interface (which may be a second Ethernet interface). At inbound data flow 314, the BMC 306 transmits the first set of one or more network packets from the second data interface to a BMC 308 of the network device. The BMC 308 can be the same as or similar to the BMC 134 of the network switch 130. The BMC 308 can have a data interface that receives the first set of one or more network packets. Generally, the processing unit and the network device will have internal network interfaces that are connected together to allow the BMC 306 to communicate with the BMC 308.

The BMC 308 is configured to receive the first set of one or more network packets (which may include one or more management requests), and generate a second set of one or more network packets for a response. The second set of one or more network packets may include confirmation of any actions taken, status updates, etc. At outbound data flow 316, the BMC 308 transmits the second set of one or more network packets from the data interface of the BMC 308 to the second data interface of the BMC 306, via the internal network interfaces of the network device and the processing unit. At outbound data flow 318, the BMC 306 transmits the second set of one or more network packets from the first data interface of the BMC 306, to the NIC 304. Finally, at outbound data flow 320, the NIC 304 transmits the second set of one or more network packets to the user 302 over the external network, via the external network interface of the NIC 304.

Although the disclosed implementations have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various implementations of the present disclosure have been described above, it should be understood that they have been presented by way of example only, and not limitation. Numerous changes to the disclosed implementations can be made in accordance with the disclosure herein, without departing from the spirit or scope of the disclosure. Thus, the breadth and scope of the present disclosure should not be limited by any of the above described implementations. Rather, the scope of the disclosure should be defined in accordance with the following claims and their equivalents.

What is claimed is:

1. A computing system comprising:
a processing unit including a first baseboard management controller (BMC), an external network interface coupled to the first BMC, and a first internal network interface coupled to the first BMC, the first BMC allowing for out-of-band management of the processing unit via a connection to an external network;
a network device including a second BMC and a second internal network interface coupled to the second BMC, the second internal network interface of the network device being connected to the first internal network interface of the processing unit, the second BMC not allowing for out-of-band management of the network device via a connection to the external network,
wherein the first BMC is configured to transfer data between the external network and the second BMC via (i) the external network interface, (ii) the first internal network interface, and (iii) the second internal network interface, such that the second BMC is configured to be connected to the external network through the first BMC.

2. The system of claim 1, wherein the data includes one or more out-of-band management requests associated with the network device, and wherein the first BMC is configured to receive the one or more out-of-band management requests from the external network via the external network interface.

3. The system of claim 2, wherein the first BMC is configured to transmit the one or more out-of-band management requests to the second BMC via the first internal network interface and the second internal network interface.

4. The system of claim 3, wherein the second BMC is configured to generate at least one response to the one or more out-of-band management requests and transmit the at least one response to the first BMC via the first internal network interface and the second internal network interface.

5. The system of claim 3, wherein the first BMC is configured to transmit the one or more responses to the one or more out-of-band management requests to the external network via the external network interface.

6. The system of claim 1, wherein the first internal network interface includes (i) a first physical layer (PHY) circuit and (ii) a first reduced media-independent interface (RMII) connection that connects the first PHY circuit to the first BMC, and wherein the second internal network interface includes (i) a second PHY circuit and (ii) a second RMII connection that connects the second PHY circuit to the second BMC.

7. The system of claim 6, wherein the first PHY circuit of the processing unit and the second PHY circuit of the network device are connected together via a wired connection.

8. The system of claim 7, wherein the wired connection is an Ethernet connection.

9. The system of claim 1, wherein the external network interface of the processing unit includes (i) a network interface card (NIC) and (ii) an RMII connection that couples the NIC to the first BMC.

10. The system of claim 9, wherein the NIC of the processing unit is coupled to the external network via a wired connection or a wireless connection.

11. The system of claim 1, wherein the first BMC includes a first data interface and a second data interface, the first data interface of the first BMC forming a portion of the external network interface, the second data interface of the first BMC forming a portion of the first internal network interface.

12. The system of claim 11, wherein the first BMC includes a data bridge between the first data interface and the second data interface, to thereby transfer data between the external network interface of the processing unit and the first internal network interface of the processing unit.

13. The system of claim 1, wherein the processing unit includes a first serial communications interface, and the network device includes a second serial communications interface coupled to the first serial communications interface via an inter-integrated circuit ($I^2C$) connection, and wherein the second BMC is configured to transmit a MAC address of the network device to the first BMC via the first and second serial communications interfaces.

14. The system of claim 1, wherein the network device is a network switch.

15. A method of managing a network device, the method including:
  receiving, at a baseboard management controller (BMC) of a processing unit, an out-of-band management request from an external network, the BMC of the processing unit allowing for out-of-band management of the processing unit via a connection to the external network;
  transmitting, via an internal network, the out-of-band management request from the BMC of the processing unit to a BMC of a network device, the BMC of the network device not allowing for out-of-band management of the network device via a connection to the external network;
  generating, by the BMC of the network device, a response to the out-of-band management request;
  transmitting, via the internal network, the response to the out-of-band management request from the BMC of the network device to the BMC of the processing unit; and
  transmitting the response to the out-of-band management request from the BMC of the processing unit to the external network, such that the BMC of the network device is connected to the external network through the BMC of the processing unit.

16. The method of claim 15, further comprising:
  generating a virtual data bridge between (i) a first data interface of the BMC of the processing unit and (ii) a second data interface of the BMC of the processing unit;
  receiving, at the BMC of the processing unit, a unique identifier that is associated with the network device; and
  in response to receiving the out-of-band management request at the first data interface and determining that the out-of-band management request includes the unique identifier, outputting the out-of-band management request at the second data interface,
  wherein the first data interface is connected to the external network, and the second data interface is connected to the BMC of the network device via the internal network.

17. The method of claim 16, further comprising:
  receiving the response to the out-of-band management request at the second data interface of the BMC of the processing unit; and
  outputting the response to the out-of-band management request at the first data interface of the BMC of the processing unit.

18. The method of claim 15, wherein the network device is a network switch.

19. The computing system of claim 1, wherein the data transferred between the external network and the second BMC includes (i) one or more out-of-band management requests received from the external network, (ii) one or more responses to the one or more out-of-band management requests received from the second BMC, or (iii) both (i) and (ii).

20. The computing system of claim 1, wherein the first BMC is configured to determine if the data received from the external network includes a unique identifier of the network device, and in response to the data including the unique identifier, transfer the data to the second BMC of the network device via the first internal network interface of the first BMC and the second internal network interface of the second BMC.

* * * * *